Aug. 11, 1964    W. F. F. MARTIN-HURST    3,143,794
METHOD OF MAKING FLEXIBLE METALLIC BELLOWS
Filed Aug. 18, 1960    2 Sheets-Sheet 1

INVENTOR
WILLIAM F. F. MARTIN-HURST

By Norris & Bateman
Attorneys

3,143,794
METHOD OF MAKING FLEXIBLE METALLIC BELLOWS

William F. F. Martin-Hurst, Hen, Bersondy, Scethrog, near Brecon, South Wales, assignor to Teddington Aircraft Controls Limited, Cefn Coed, near Merthyr Tydfil, South Wales
Filed Aug. 18, 1960, Ser. No. 50,479
Claims priority, application Great Britain Aug. 18, 1959
4 Claims. (Cl. 29—454)

Flexible metallic bellows have numerous applications particularly in connection with measuring or control instruments, expansion joints or flexible joints but in practically all applications they are subjected to either internal or external pressure. When used unreinforced it is well known that there is an optimum ratio between the length and the diameter, otherwise the very minute differences which exist between individual corrugations or ribs may cause a "long" bellows to buckle or otherwise become distorted particularly at the higher pressures. It is also necessary when working at the higher pressures to use material of sufficient thickness not only to withstand the pressure difference across the bellows but to obtain stability. This results in decreased flexibility, i.e. a higher rate.

To overcome these disadvantages it has already been proposed to fit external reinforcing rings or segments in the bottom of the grooves between corrugations when the bellows is to be used with an internally applied pressure.

The object of the present invention is to provide a method of making a flexible metallic bellows reinforced internally for use with higher pressures applied externally. The advantages of being able so to do have been recognized but previous attempts have been only partially successful owing to the practical difficulty of inserting into each internal groove a reinforcement which must have a larger diameter than the internal diameter of the bore through the bellows. One known method is to use hollow rings in the form of a closely coiled spring. Such reinforcement is successful only in so far that the reinforcement itself is flexible.

According to the present invention the reinforcement is in the form of continuous solid or tubular rings of circular cross section having approximately the same diameter as the radius of the inner surface of the desired corrugation.

The advantages of a bellows using this construction are:

(1) It is capable of withstanding a higher pressure applied externally for a given thickness of metal.

(2) For a given working pressure, it may be made of thinner material thus increasing flexibility and reducing the rate.

(3) It is more stable, i.e. is not prone to buckling or other distortion where the length of the bellows is substantially greater than its diameter.

(4) It has a higher safety factor, i.e. it can be subjected to pressures very much higher than those at which the bellows are normally intended to work and while such pressures may result in distortion of the bellows thus causing it to lose its rate/movement characteristics, the bellows is unable to collapse in the same way as an un-reinforced bellows. It is thus less prone to burst or become perforated under extreme conditions, an important factor when dealing with dangerous fluids or gases.

A preferred method of carrying out the invention will now be described with reference to the accompanying drawings of which:

The method to be described involves a number of operations which may be grouped to form a plurality of stages. The various operations and stages will be described in turn.

FIRST STAGE

Figure 1:
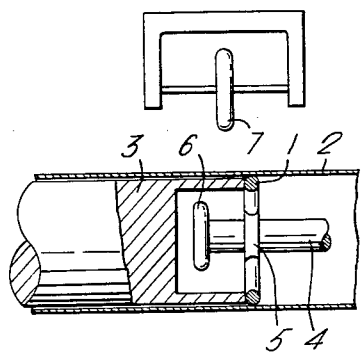
FIGS. 1 to 8 show various stages in the manufacture of reinforced bellows.

*Operation 1.*—The reinforcing ring 1 which is made to be an interference fit in the tube 2 is forced into position by a ring-positioning mandrel 3 or similar plunger as shown in FIG. 1. It will be noted that the driven mandrel 4 is fitted with one concave internal roller 5 and one convex internal roller 6 while a single convex free roller 7 is mounted externally.

Figure 2:
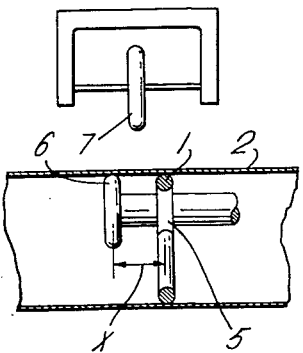

*Operation 2.*—The mandrel 3 is withdrawn and the tube 2 allowed to drop so that the ring 1 now rests in the concave roller 5. FIG. 2 shows the condition just prior to commencement of rolling.

Figure 3:
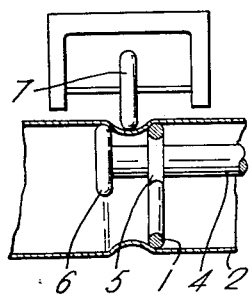

*Operation 3.*—The exterior roller 7 is depressed as shown in FIG. 3 through a predetermined dimension, while the rollers and tube rotate thus forming an initial comparatively shallow groove.

Figure 4:
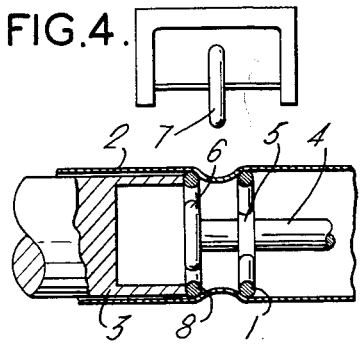

*Operation 4.*—Rolling stops and roller 7 is withdrawn while the mandrel 3 inserts a second ring 8 into position in the tube 2 as shown in FIG. 4.

Figure 5:
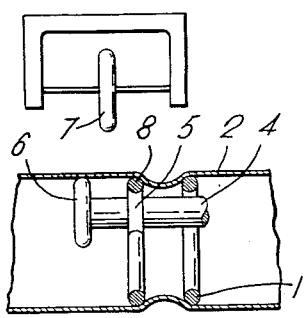

*Operation 5.*—The relative positions of the rollers and tubes are changed so that the second ring 8 may now rest in the concave roller 5 as shown in FIG. 5. A second groove is now rolled between the convex roller 6 and the ring 8.

It will be understood that the foregoing operations are repeated until the appropriate number of rings has been inserted and the corresponding grooves have been rolled to provide the number of corrugations according to the desired length of bellows.

The function of the first stage is two-fold, namely, (a) To trap the rings into position and
(b) To fix the spacing between corrugations.

It will be appreciated from FIG. 2 that the spacing between the internal rollers determines the length of tube used to form each final corrugation.

SECOND STAGE

Figure 6:
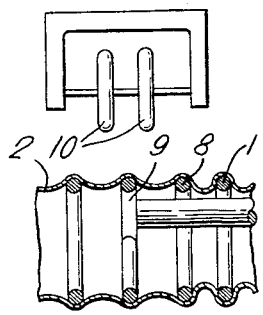

*Operation 6.*—As will be seen from FIG. 6, one concave internal roller 9 and two convex external rollers 10 are used in this Stage. The spacing of the two external rollers is less than the spacing of the two internal rollers 6 and 5 used in Stage 1. Depression of the external rollers 10 will result in a deepening of the grooves and the consequent reduction in the distance between the reinforcing rings, i.e. between the corrugations. This operation is of course repeated for the requisite number of times for the complete bellows.

THIRD STAGE

Figure 7:
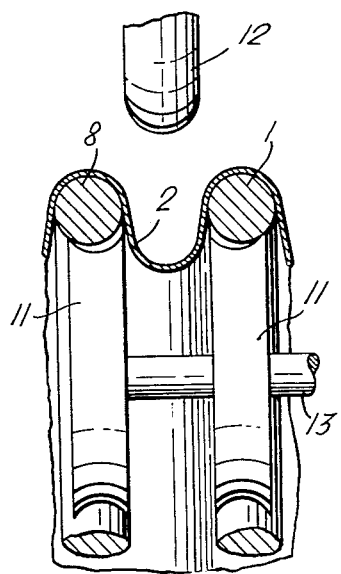
Figure 8:
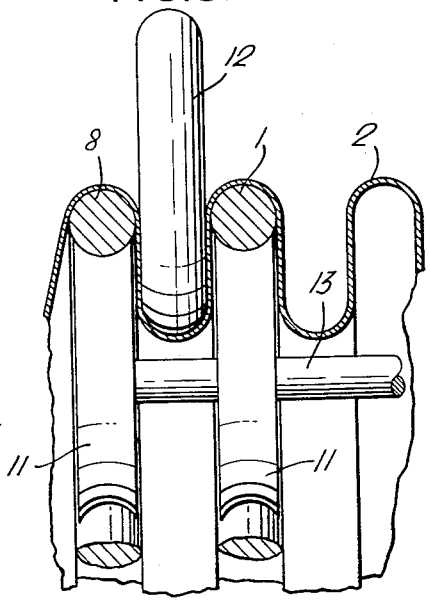

*Operation 7.*—It will be noted from FIG. 7—which has been drawn to a larger scale—that in the third stage two internal concave rollers 11 are used with one external convex roller 12. In this operation the spacing between the two internal rollers 11 has been reduced so that it is less than that of the two external rollers 10 in Stage 2 i.e. it is slightly less than the spacing of the reinforcing ring positions resulting from Stage 2. This means that, as shown in FIG. 7, at the commencement of this operation, the reinforcing rings do not coincide with and sit truly in the concave rollers 11 but tend to ride on the outer edges. However, as the mandrel 13 is turned and the exterior roller 12 depressed, the rings almost immediately fall into position as shown in FIG. 8 so that the groove is further deepened and its sides become parallel.

Figure 9:
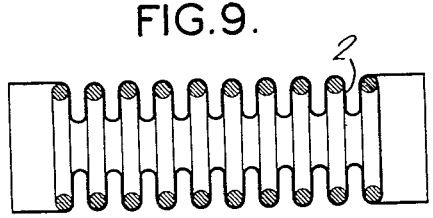
FIGS. 9 and 10 show two forms of completed bellows.
Figure 10:
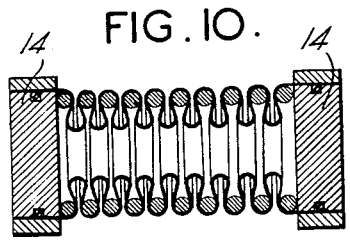

The three stages carried out so far result in a reinforced flexible metallic bellows having substantially parallel walls as shown in FIG. 9 and the bellows may be used in this condition for a number of applications. Where however greater flexibility is required it is obtained by a further operation in which the ends of the bellows are sealed as shown at 14 in FIG. 10 so that the bellows may be subjected to an externally applied hydraulic pressure. This is done by placing the sealed bellows inside a chamber the latter being subjected to sufficient hydraulic pressure to cause the corrugations to be permanently deformed to the toroidal form shown in FIG. 10.

I claim:

1. The method of manufacturing an internally reinforced flexible metallic bellows which comprises the steps of inserting axially into a straight-walled tube of thin metal a rigid continuous ring having an outer diameter corresponding to the inner diameter of said tube, supporting said tube wall and inserted ring on axially spaced mandrel rollers, transversely deforming the tube wall between said rollers to externally groove the tube therebetween, axially inserting a second similar rigid continuous ring into said tube and against the wall of said groove in the bore of said tube on the side of said groove opposite said first ring, supporting the tube wall on the side of said groove opposite said first ring and said second ring on said axially spaced mandrel rollers, transversely deforming said tube wall between said rollers to externally groove said tube therebetween and thereby form a second external groove in said tube wall and secure said second ring axially between said grooves, and repeating the foregoing steps until a desired number of axially spaced reinforcing rings have been mounted within said tube and secured between said grooves.

2. In the method defined in claim 1, the further steps of successively supporting each said inserted ring internally while simultaneously deepening the external tube wall grooves on opposite sides of the supported ring.

3. In the method defined in claim 2, the further steps of successively internally supporting each adjacent pair of inserted rings while further deepening the external tube wall groove between each said pair.

4. The method of manufacturing an internally reinforced flexible metallic bellows which comprises the steps of inserting axially into a substantially uniform diameter tube of thin metal a first rigid continuous ring having an outer diameter corresponding to the inner diameter of the tube, internally supporting said ring and the tube wall at an axially spaced region, transversely deforming the tube wall between said ring and said region to externally groove the tube therebetween, axially inserting a second similar rigid ring into the tube and against the side of said groove in the bore of said tube opposite the first ring, internally supporting said second ring and another region of the tube wall at the side opposite said groove, transversely deforming said tube wall between said second ring and said other region to form another external groove therebetween and secure said second ring axially between said grooves, and repeating the foregoing steps until a desired number of axially spaced reinforcing rings have been secured between the grooves within the tube.

References Cited in the file of this patent

UNITED STATES PATENTS

| | | |
|---|---|---|
| 1,561,065 | Eggleston | Nov. 10, 1925 |
| 2,153,173 | Campbell | Apr. 4, 1939 |
| 2,373,680 | Hawley | Apr. 17, 1945 |
| 2,446,281 | Harding | Aug. 3, 1948 |
| 2,823,702 | November | Feb. 18, 1958 |

FOREIGN PATENTS

| | | |
|---|---|---|
| 708,598 | France | May 4, 1931 |
| 528,412 | Germany | June 29, 1931 |